UNITED STATES PATENT OFFICE 2,541,671

PREPARATION OF A FLUID CATALYST FOR HYDROCARBON SYNTHESIS

Marnell A. Segura, Denham Springs, Don R. McAdams and William E. Spicer, Baton Rouge, La., assignors to Standard Oil Development Company, a corporation of Delaware No Drawing. Application September 5, 1946, Serial No. 695,042

4 Claims. (Cl. 252—474)

This invention relates to catalytic conversions and improved catalysts therefor. More specifically the invention is concerned with improved iron catalysts for fluid catalyst operation, particularly for the catalytic synthesis of normally liquid hydrocarbons and/or oxygenated compounds from CO and $H_2$.

Iron type catalysts are normally employed in the hydrocarbon synthesis at relatively high temperatures of about 450°–800° F. and relatively high pressures of about 3–100 atm. abs. or higher, to obtain predominantly unsaturated and oxygenated products from which motor fuels with high octane ratings may be recovered.

The extreme temperature sensitivity and relatively rapid catalyst deactivation of the hydrocarbon synthesis have led in recent years to various attempts and proposals to employ the so-called fluid catalyst technique wherein the synthesis gas is contacted with a dense turbulent bed of finely divided catalyst fluidized by the gaseous reactants and products and which permits continuous catalyst replacement and greatly improved temperature control. However, the adaptation of the hydrocarbon synthesis to the fluid catalyst technique has encountered serious difficulties, particularly when iron catalysts are used.

Application of the fluid catalyst technique requires, in addition to the conventional characteristics determining catalyst utility, such as total desired yield and active catalyst life ease of fluidization and attrition resistance. None of the prior art iron catalysts complies satisfactorily with all of these requirements.

Iron catalysts are usually prepared by the reduction of various natural or synthetic iron oxides or by the decomposition of iron carbonyls, the catalytic activity being enhanced by the addition of such promoters as various compounds of alkali metals or the oxides of chromium, zinc, aluminum, magnesium, manganese, the rare earth metals, and others, in small amounts of about 1–10%. While some of these catalysts exhibit excellent activity characteristics they are without exception deficient with respect to ease of fluidization and/or attrition resistance for the following reasons.

Catalysts obtained by the reduction of natural iron oxides, such as various oxidic iron ores, may be ground to a fluidizable particle size, however not without excessive losses in the form of fines having particle sizes below the minimum fluidizable size of about 30 microns. In addition, these catalysts have a varying and often undesirably low degree of purity which detrimentally affects their performance as well as their reproducibility.

Iron catalysts prepared by the reduction of synthetic oxides, such as precipitated red or yellow iron oxides or by the decomposition of iron carbonyls, are obtained in the form of extremely fine powders having particle sizes far below the fluidizable range. Attempts to convert these powders into fluidizable materials by agglomerating treatments, such as pilling or sintering, have failed as a result of either the low attrition resistance or the irregularity of the agglomerates.

The present invention overcomes the aforementioned difficulties and affords various additional advantages as will be fully understood from the more detailed description given below.

It is, therefore, the main object of our invention to provide an improved process for the catalytic conversion of CO and $H_2$.

Another object of our invention is to provide an improved catalyst for the hydrocarbon synthesis and a method of preparing the same.

A more specific object of our invention is to provide an iron catalyst for the hydrocarbon synthesis, which combines high activity and long catalyst life with highest utility for fluid catalyst operation.

A still further object of our invention is to provide an improved hydrocarbon synthesis process operated by the fluid catalyst technique.

Another object of our invention is to provide an iron catalyst having improved utility for fluid catalyst operation.

Other and further objects and advantages will appear hereinafter.

In accordance with the present invention well fluidizable iron catalysts are obtained by subjecting reduced precipitated iron oxides to a sintering treatment in an oxidizing atmosphere and grinding the sintered material to a fluidizable particle size. A reducing treatment may precede or follow the grinding. We have found that the sintering treatment in an oxidizing atmosphere such as air and/or oxygen or other oxidizing gas converts the finely divided reduced metal oxide into a mass of excellent mechanical properties which may be ground in conventional grinders to a desired particle size within the range of, say, 30–250 microns or about 60–400 mesh with a negligible loss in the form of non-fluidizable fines of less than 30 microns or about 400 mesh particle size. In addition, our fluidizable catalyst particles are far superior to fluidizable iron catalysts prepared from natural iron oxides or by agglomeration of precipitated oxides, with respect to purity, reproducibility and/or attrition resistance, and they exhibit highest catalytic activity and satisfactory catalyst life.

It is important for the catalytic, mechanical and pseudo-hydrodynamic properties of the catalysts of our invention that the sintering treatment be subsequent to any treatment with liquids or solids, which affects the chemical composition and/or physical structure of the catalyst. When preparing our catalysts, we prefer, therefore, to combine the iron oxide with any addition agents desired, such as activators or the like, preferably by impregnation and to subject the resulting composite to reduction followed by oxydative sintering and grinding to the desired particle size.

Best results are obtained when fine iron oxide powders, particularly the precipitated material known as red iron oxide, are employed which have substantially uniform particle sizes of less than, say, about 50 microns and preferably less than about 30 microns. These iron oxide powders may first be impregnated with suitable solutions of activators or other additives to yield a powdered or lumpy mass which may be pilled to facilitate handling, reduced and repilled and which is then subjected to oxydative sintering to form a hard friable mass which is ground to the desired particle size of say about 30 to 200 microns. A reducing treatment may precede or follow the grinding treatment, but in accordance with the preferred embodiment of our invention the ground, sintered particles are reduced prior to use.

Suitable sintering temperatures fall within the approximate range of 1200°–1600° F. with temperatures around 1300° F. preferred. The sintering treatment should be carried at least to a point at which surface deformation of the sintered particles becomes appreciable. Reduction temperatures ranging from about 800° to about 1500° F. are generally adequate to obtain the desired degree of reduction which may reach the metallic state or any oxygen concentration known to be beneficial for iron catalysts.

A typical method suitable for preparing iron catalysts useful in fluid catalyst operation is illustrated by the following example.

EXAMPLE

An amount of 4,950 grams of a precipitated red-iron oxide powder having an average particle size of about 10–20 microns is impregnated with a solution of 50 grams of potassium carbonate in 500 cc. of distilled water. The resulting paste is dried at 240° F. and then pilled into pills of $\frac{1}{8}$" diameter. This initial pilling serves merely to facilitate the handling. The pilled material is then reduced with hydrogen at 1010°–1050° F. and repilled. The reduced, pilled material is sintered in air at 1300° F. for a period of 75 minutes and then allowed to cool. The cold sintered oxidic material is ground to a particle size of at least 50%, but preferably about 80%, falling within the approximate range of 50–325 mesh. A typical sieve analysis of the ground material is as follows:

TABLE I

| | Per cent |
|---|---|
| 80 mesh | 0.4 |
| 100 mesh | 6.4 |
| 200 mesh | 46.0 |
| 325 mesh | 34.2 |
| Through 325 mesh | 13.0 |

The ground material is reduced at 1030° F. with 1000 volumes of hydrogen per volume of catalyst per hour for 4 hours.

Samples prepared as described above fluidize readily, both in nitrogen and synthesis gas mixtures of carbon monoxide and hydrogen. For example, at superficial gas velocities normal for dense phase fluid operation, such as 0.2–0.4 ft. per second, a turbulent fluidized solids bed is formed having a well defined upper level and exhibiting a steady pressure drop over the height of the fluidized mass similar to that of a liquid. Small amounts of entrained solids may be readily separated from the gas by conventional mechanical gas-solids separators. The catalyst retains essentially this condition in normal fluid operation at least for several months.

One portion of a catalyst sample prepared in accordance with the above example was subjected to a laboratory attrition test wherein the sample to be tested, after being ground to pass a 100 mesh screen, is subjected to the action of an air jet in a standard Roller analyzer. The rate of air used is 21 liters per minute through a .0700" jet. A settling chamber is used in connection with the air jet and causes the return to the zone of "attrition" of all particles larger than 20 microns. The 0–20 micron material is collected from the overhead stream and weighed hourly over a period of five hours. The results of this attrition test were as follows:

TABLE II

| Time in Roller Analyzer | Wt. Per Cent 0–20 Microns |
|---|---|
| 1st Hour | 10.3 |
| 2nd Hour | 2.6 |
| 3rd Hour | 1.7 |
| 4th Hour | 1.7 |
| 5th Hour | 1.1 |
| Avg. After 1st Hr | 1.7 |

A second portion of the catalyst sample prepared in accordance with the above example was tested for its synthesis activity in fixed bed operation. The test conditions and results were as follows:

TABLE III

*Test conditions*

| | |
|---|---|
| Hours | 621–644 |
| Temperature °F | 599 |
| Pressure p. s. i. g | 249 |
| Feed rate, v./v./hr. | 197 |
| H$_2$/CO ratio | 1.2 |
| Collected oil cc | 126 |
| C$_4$+/cu. m. of synthesis gas fed cc | 162 |
| Hydrocarbon dist. ratio | 0.65 |
| C$_4$+/cu. m. of synthesis gas consumed cc | 194 |

The experimental results reported above demonstrate that the catalysts prepared in accordance with the present invention combine perfect ease of fluidization with highest attrition resistance and catalytic activity. It is also noted that these catalysts possess remarkable reproducibility which is uncommon with catalysts of similar type.

While we have described our invention with specific reference to the catalytic synthesis of hydrocarbons it will be readily understood that the invention affords similar advantages in connection with other fluid catalyst operations involving the use of iron type catalysts, for example the hydrogenation of unsaturated hydrocarbons, the synthesis of ammonia, the halogenation of certain hydrocarbons, etc.

The present invention is not to be limited by any theory of the mechanism of the process or catalyst nor to any examples given merely for illustration purposes, but only by the following claims in which we wish to claim all novelty inherent in the invention.

We claim:

1. The method of preparing iron catalysts which comprises subjecting a reduced precipitated iron oxide mass to a sintering treatment in an oxidizing atmosphere at a temperature of about 1200°–1600° F., grinding the sintered material to a fluidizable particle size and reducing the sintered material at a temperature of about 800°–1500° F.

2. The method of claim 1 wherein said mass is ground to contain at least 50% of particles having a size falling within the range of 60–325 mesh.

3. The method of preparing iron catalysts which comprises incorporating potassium carbonate in a precipitated iron oxide, subjecting the composite obtained to a reducing treatment, subjecting the reduced composite to a sintering treatment in an oxidizing atmosphere at a temperature of about 1200°–1600° F., grinding the sintered product to a fluidizable particle size and reducing the sintered composite at a temperature of about 800°–1500° F.

4. The method of claim 3 wherein said composite is pilled prior to said reducing treatment and repilled prior to said sintering treatment.

MARNELL A. SEGURA.
DON R. McADAMS.
WILLIAM E. SPICER.

REFERENCES CITED

The following references are of record in the file of this patent:

UNITED STATES PATENTS

| Number | Name | Date |
|---|---|---|
| 2,183,145 | Michael | Dec. 12, 1939 |
| 2,211,022 | Michael | Aug. 13, 1940 |
| 2,254,806 | Michael | Sept. 2, 1941 |
| 2,276,693 | Heath | Mar. 17, 1942 |
| 2,287,894 | Linckh | June 30, 1942 |
| 2,365,094 | Michael | Dec. 12, 1944 |
| 2,393,909 | Johnson | Jan. 29, 1946 |
| 2,417,164 | Huber, Jr. | Mar. 11, 1947 |
| 2,445,648 | Truesdale | July 20, 1948 |
| 2,455,419 | Johnson | Dec. 7, 1948 |